United States Patent Office 3,113,951
Patented Dec. 10, 1963

3,113,951
EPOXIDATION OF OLEFINS WITH HYDROGEN PEROXIDE AND A CYANAMIDE
Paul H. Williams, Orinda, Calif., assignor to Shell Oil Company, New York, N.Y., a corporation of Delaware
No Drawing. Filed Oct. 12, 1961, Ser. No. 144,532
8 Claims. (Cl. 260—348.5)

This invention relates to a new method of epoxidation using a novel epoxidation agent for the controlled epoxidation of organic compounds containing an ethylenic linkage.

More particularly, this invention relates to the use of cyanamides and substituted cyanamides as epoxidation agents in reactions in which an oxirane ring is produced from an olefinic (that is, ethylenic) double bond by reacting a cyanamide and hydrogen peroxide with a compound containing an ethylenic double bond.

Thus, the present invention relates to a process of epoxidizing an olefinic compound which comprises reacting the olefinic compound with hydrogen peroxide and a cyanamide.

Hydrogen peroxide by itself is known to be a poor epoxidizing agent. For example 1-pentene is unaffected by 90% by weight of $H_2O_2$ even in the presence of iron or vanadium (Ind. Eng. Chem. 39, 1536 (1947)). However, the use of a peroxycarboxylic acid compound as an epoxidizing agent is well known in the art and has been widely used in a variety of important reactions involving the carbon-carbon double bond. For example, peroxybenzoic acid reacts quantitatively with non-conjugated carbon-carbon double bonds to form the corresponding epoxide according to the following reaction:

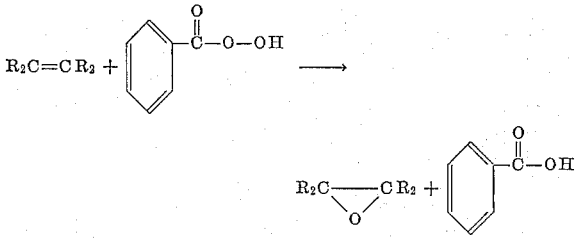

This reaction is a valuable preparative procedure, since the 1,2-epoxide ring may be easily cleaved by hydrolysis to form the corresponding 1,2-glycol. Furthermore, it is known that peroxybenzoic acid liberates iodine from potassium iodide. Thus, these reactions make possible the quantitative estimation of double bonds, an extremely useful analytical tool. Nevertheless, certain inherent disadvantages result from the epoxidation of ethylenic compounds with peroxy acids. Among these are: the slowness of the rate of epoxidation, and the undesirable interaction of the oxirane group with the by-products resulting in a lowering of the total yield of epoxidized product. Another of the principal disadvantages in the use of peroxycarboxylic acids as epoxidation reagents is the fact that the carboxylic acid formed as a by-product of the reaction tends to react with the epoxide ring to form compounds such as hydroxy esters. Thus, a certain amount of the epoxide formed is always wasted. The formation of such side products not only reduces the yield of epoxide, but tends to interfere with the formation of other epoxide groups.

It is an object of this invention to provide a new method of epoxidation. In this new process, a cyanamide and hydrogen peroxide are substituted for the conventional peroxy acids in epoxidation reactions.

The present invention thus provides a completely different epoxidation procedure and therefore offers an alternative synthetic route to the epoxides. Carboxylic acid by-products are not formed by this new method. Instead, urea and substituted ureas are produced as side products.

In accordance with the present invention, a substituted or unsubstituted cyanamide is reacted with hydrogen peroxide to form an active intermediate which immediately reacts with the olefinic double bond to form an epoxide.

The cyanamide compounds which are used with $H_2O_2$ in the present invention have the general formula:

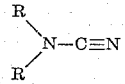

wherein each R may be the same or different and is selected from the group consisting of the hydrogen atom and an organic radical. The R groups may contain up to 35 carbon atoms and preferably contain from 1–12 carbon atoms. The R groups may be connected to each other so as to form a heterocyclic ring containing nitrogen. Other atoms which may be present in the heterocyclic ring include the chalkogens, particularly the chalkogens of atomic numbers 8–16. The olefin which is epoxidized may be an aliphatic, aralkenyl, arcycloalkenyl, alicyclic, or heterocyclic olefin. The epoxidation may be carried out with other substituted olefins such as unsaturated fatty acids and esters, fats, oils and unsaturated alcohols.

The overall reaction can be presented as:

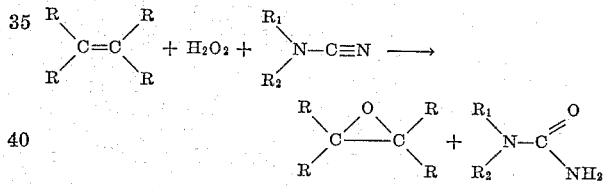

wherein R, $R_1$ and $R_2$ may be the same or different and are selected from the group consisting of the hydrogen atom and an organic radical. Examples of suitable organic radicals include aliphatic and aromatic hydrocarbons of up to about 30 carbon atoms as well as substituted aliphatic and aromatic compounds. Specific examples of such radicals include alkyl radicals such as methyl, ethyl, propyl, butyl, amyl, hexyl, heptyl, octyl, nonyl, decyl, undecyl, dodecyl, tridecyl, tetradecyl, pentadecyl, cetyl, heptadecyl, octadecyl, eicosyl, heneicosyl, ceryl, and melissyl; alkenyl radicals such as vinyl, propenyl, allyl, butenyl, pentenyl, hexenyl, heptenyl, octenyl, pentadecenyl, decenyl, etc.; aryl radicals such as phenyl, tolyl, benzyl, phenylethyl, xylyl, cumyl, mesityl, styryl, cinnamyl, naphthyl, diphenylyl, diphenylmethyl, anthryl, phenanthryl, triphenylmethyl, salicyl, anisyl, toluidino, phenylimino, etc.; alkynyl radicals such as ethynyl, propargyl, etc.; cyclic radicals such as cyclohexyl, cyclopentyl, cyclopropyl, cyclobutyl, cyclohexadienyl, etc. When R is a hydrocarbon radical, R generally contains from 1–10 carbon atoms. While $R_1$ and $R_2$ may be unsaturated radicals, the presence of unsaturated linkages may reduce the yield of the desired epoxide because of the formation of epoxide rings in the substituted cyanamide compound. It is therefore preferable to use cyanamide compounds in which both $R_1$ and $R_2$ are saturated hydrocarbon radicals of from one to twelve carbon atoms. The olefins may contain a multiplicity of double bonds and include dienes, trienes, tetraenes, and so forth. Non-conjugated double bonds are most easily epoxidized. However, the specific nature of the olefin is immaterial for the purpose of the present reaction, since it is only necessary that the classical aliphatic carbon-carbon double bond exist in the molecule. That is, the compounds are characterized by the presence of π electrons, or unsaturation electrons, between at least one pair of adjacent carbon atoms. Other examples of suitable olefins may be found in U.S. Patent 2,391,330 (December 18, 1945), U.S. 2,342,074 (February 15, 1944), and U.S. 2,785,185 (March 12, 1957).

The cyanamide starting materials of the present invention may be prepared by a variety of chemical methods. For example, alkyl, alkenyl, or aryl halides (or sulfates) react with alkali metal cyanamides to yield the corresponding dialkyl, dialkenyl or diaryl cyanamides according to the following reaction:

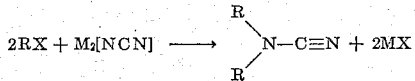

wherein M denotes an alkali metal, X represents a halogen atom, and R may be an alkyl, alkenyl, or aryl radical. Typical starting materials which may be prepared by this general method include substituted and unsubstituted dialkenyl cyanamides such as bis(3-chloro-2-butenyl) cyanamide, bis(dimethylallyl)cyanamide, bis(3-methyl-2-butenyl)cyanamide, diallyl cyanamide, and digeranyl cyanamide,

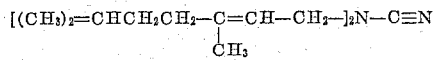

Aralkyl and aralkenyl cyanamides such as dibenzylcyanamide and distyrylcyanamide may also be prepared by above method. Typical examples of alkyl cyanamides which may be prepared include: dibutylcyanamide, diethylcyanamide, diisopentylcyanamide, diisopropylcyanamide and dimethylcyanamide. R may contain from 1 to 15 carbon atoms. Compounds in which R has from 1 to 10 carbon atoms are preferred. R may contain inorganic substituents, such as, chloride, bromide, iodide, nitro, oxygen, sulfonyl, and other anions of inorganic acids.

Monoaryl cyanamides and heterocyclic cyanamides are also useful as starting materials in the present invention and may be prepared by various methods. For example, 2,4-dinitrophenylcyanamide may be prepared by reacting 1-chloro-2,4-dinitrobenzene with cyanamide according to the following reaction:

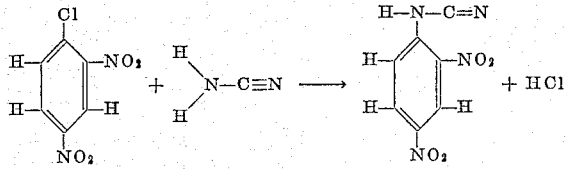

Similarly, with picryl chloride, 2,4,6-trinitrophenylcyanamide is produced. With 2,4,5-trinitrotoluene, one of the nitro groups is replaced to give 3,6-dinitro-m-tolylcyanamide:

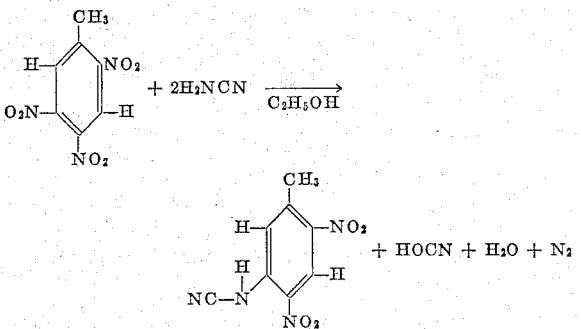

Unsymmetrical disubstituted cyanamides such as methyl-1-naphthyl-methyl cyanamide, allyl-1-naphthylmethyl cyanamide, n-octyl-1 naphthylmethyl cyanamide, and n-dodecyl-1-naphthylmethyl cyanamide may also be used in the present process. Other suitable cyanamides include ethyl n-amyl cyanamide, isobutyl allyl cyanamide, methyl n-heptyl cyanamide, isoamyl propargyl cyanamide, ethyl n-octyl cyanamide, and methyl n-cetyl cyanamide. Halogen-substituted cyanamides which may be used include 2-chloroethyl ethyl cyanamide and the corresponding bromo compound. Aralkyl cyanamides such as benzyl ethyl cyanamide and benzyl methyl cyanamide may also be used. Cyanamide also reacts with potassium 1,2-naphthoquinone-4-sulfonate to yield the corresponding cyanamide derivative according to the reaction:

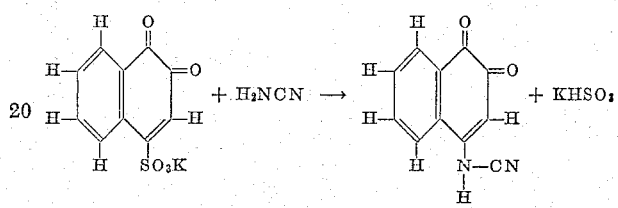

As an example of the preparation of a heterocyclic cyanamide, the reaction of 2-chloro-4,6-dimethylpyrimidine with sodium hydrogen cyanamide gives 4,6-dimethyl-2-pyrimidine-carbamonitrile:

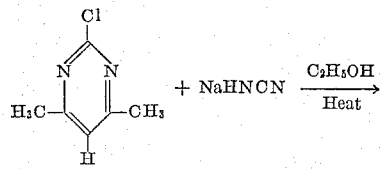

Sodium hydrogen cyanamide also reacts with alkyl halides to yield a mixture of dialkylcyanamide and $N^2, N^4$-dialkylmelamine. For example, with ethyl bromide the reaction proceeds as follows:

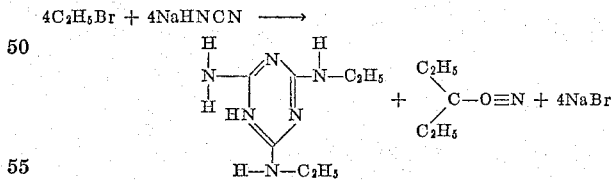

The alkylation of cyanamide may be similarly accomplished with dialkyl sulfates, but in general the yields of the dialkylcyanamides are poor due to the formation of undesirable polymers during the reaction. Diethyl sulfate and sodium hydrogen cyanamide give a mixture of ethyl- and diethylcyanamide.

When cyanamide is used with hydrogen peroxide as the epoxidizing reagents of the present invention, the cyanamide may be conveniently prepared by the reaction of calcium cyanamide, water, and carbon dioxide at a pH of 7–8 and temperature of 35–40° C. An addition rate of 400 grams of Ca=N—C≡N per liter of water over a one-hour agitation period is satisfactory. The carbon dioxide is added at the maximum rate, up to the point where foaming or spilling might occur. Filtration of the resulting slurry yields a solution containing approximately 8% by weight of cyanamide. More concentrated solutions of cyanamide can be obtained by repeating the procedure with the first cyanamide solution diluted up to one liter. When this method of generating cyanamide is used, the epoxidation reaction proceeds according to the following equation:

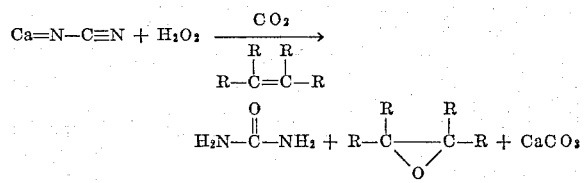

In this reaction each R may be the same or different and is selected from the group consisting of the hydrogen atom and an organic radical of from 1 to 35 carbon atoms. Preferably, R is an organic radical of from 1 to about 20 carbon atoms. When R is a hydrocarbon, R may contain from 1 to 30 carbon atoms (preferably from 1 to about 8) and includes radicals containing rings and condensed ring systems. Alkali metal cyanamides and alkaline earth metal cyanamides are also suitable as a source of cyanamide and substituted cyanamides. Both sodium hydrogen cyanamide and sodium cyanamide are used as sources of cyanamide in organic synthesis.

Thus, a particularly advantageous embodiment of the process of the present invention comprises expoxidizing an olefin by reacting the olefin with a cyanamide salt and hydrogen peroxide. If carbon dioxide is present and calcium cyanamide is the cyanamide salt employed, calcium carbonate precipitates out and the reaction products are more conveniently separated from the reaction mixture. Cyanamide salts especially alkali metal and alkaline earth metal cyanamides or ammonium cyanamide may be used directly as a source of cynamide ion by reacting the salt with water at a pH of between 4 and 8 and a temperature below 40° C.

Other precipitants such as sulfuric acid, $NaHSO_4$, $Na_2SO_4$, $Na_2CO_3$, soluble sulfate salts, oxalic acid and soluble oxalate salts may also be used in place of carbon dioxide.

The only functional requirement of the compound to be epoxidized in the present invention is the presence in the molecule of an olefinic carbon-carbon double bond. Under this restriction the cyanamide or substituted cyanamide and hydrogen peroxide invariably react to convert the ethylenic double bond to an epoxide group. If substituents are present in the ethylenic compound which also react with the cyanamide and hydrogen peroxide, such side reactions do not interfere with the basic epoxidation reaction. The only effect of such substituents is to consume a portion of the reactants; thereafter the epoxidation of the double bond proceeds as outlined in the preceding paragraphs. For example, compounds which are known to be epoxidized by conventional types of peroxy acids would also be epoxidized by the method of the present invention. Numerous examples of such compounds may be found, for instance, in Swern, "Chemical Reviews," vol. 45, page 1 et seq. (1949).

The epoxidation reaction may be conducted at atmospheric pressure and in general any pressure within the range of .1 to 100 atmospheres is suitable. The temperature of the epoxidation reaction may vary from 0° C. to about 75° C. The preferred temperature range for the epoxidation reaction is between 30° C. and 40° C. The pH measured with standard indicator paper may vary between 4.0 and 12, but is preferably in the range of 6.0 to 9.5. The olefin reactant is preferably present in a slight molar excess, usually about a 10% excess based upon the moles of cyanamide present or generated from cyanamide salts. The hydrogen peroxide reactant is generally employed in an equimolar ratio based upon the cyanamide. Ordinarily, there is no reason to use more than 2 moles of olefin per mole of cyanamide (or $H_2O_2$) or less than one-half mole of olefin per mole of cyanamide (or $H_2O_2$). Ratios of about .25 to 4 moles of ethylenic double bond per mole of cyanamide or substituted cyanamide epoxidizing agent may be used. When an excess of the compound containing the ethylenic double bond which is to be epoxidized is used, ratios in the range of about 1.1 to about 2 moles of olefinic compound per mole of cyanamide or hydrogen peroxide are preferable. Mole ratios of cyanamide or substituted cyanamide to hydrogen peroxide may vary from about 0.1:1 to 4:1. Intermediate ranges in which the ratios are 1:1 to 3:1 are desirable, however, and the most preferred range includes ratios of from 1.2:1 to about 2:1. It is generally advantageous to choose reactant ratios so that one ethylenic linkage is oxidized to the epoxide for every mole of hydrogen peroxide. This will ordinarily mean that the ratio of moles of ethylenic double bond per mole of hydrogen peroxide will be 1:1 to around 2:1 with approximately one or two equivalents of cyanamide or substituted cyanamide for each ethylenic group.

The reaction may be carried out with or without a solvent. The use of a solvent is generally preferred because of the increased convenience in handling the reactants. The selection of a solvent is not critical and suitable solvents include hydrocarbons such as benzene, toluene, xylenes, pentane, hexane and cyclohexane. Alcohols such as methanol, ethanol, propanol, tertiary butyl alcohol, isopropanol, isobutyl alcohol, allyl alcohol, methalyl alcohol, ethylene glycol, and 2-methyl-2,4-pentanediol are also useful solvents. Ketones, ethers, and esters such as acetone, methyl ethyl ketone, cyclohexanone, diacetone alcohol, dimethyl ether, ethylene glycol monomethyl ether, dioxane, and ethylene glycol monoacetate may also be used. The solvent may be inert or reactive. However, when reactive solvents are used the separation of the reaction products is usually more difficult to accomplish. The solvent concentration may comprise from 0 to 98% of the total weight of the reaction mixture; from 10 to 30% by weight of the reaction mixture is ordinarily sufficient when carrying out the reaction of the present invention.

The pH of the reaction should be at least 4 and can be conveniently controlled with any alkaline reagent. Sodium hydroxide is probably the most convenient alkaline reagent to use but other reagents are also suitable. For example, potassium hydroxide, ammonium hydroxide, magnesium hydroxide, calcium hydroxide, sodium oxide, calcium oxide, magnesium oxide, sodium carbonate, sodium bicarbonate, tripotassium phosphate, mono-, di- or trialkylamines such as trimethyl-, triethyl- and tripropylamine, potassium and calcium phenates, sodium metamethyl phenoxide, sodium naphthoxide, and amine or quaternary ammonium base resins in hydroxyl or basic salt form may be used. Further examples of suitable bases for control of the pH of the reaction will readily occur to those skilled in the art.

The reactants may be added in any order and the process of the present invention may be conducted continuously, intermittently, or batchwise. Stirring the reactants or other forms of agitation is not necessary but reduces the time required to complete the reaction by promoting intimate contact of the reactants.

The use of the novel cyanamides and substituted cyanamides in conjunction with hydrogen peroxide as epoxidation reagents may be further illustrated by the following examples. It is to be understood, however, that the invention is not to be considered as limited to the specific modes or conditions of operation shown in the examples.

*Example I.—Epoxidation of Cyclohexene*

Cyanamide was reacted with hydrogen peroxide in the presence of cyclohexene in methanol solution according to the following reaction:

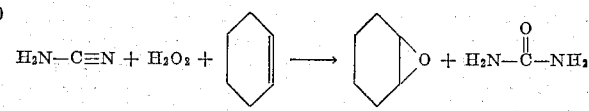

Thus, a mixture of 12.6 grams (0.30 mole) of cyanamide, 250 ml. of methyl alcohol, 32.8 grams (0.40 mole) of cyclohexene, and 20.35 grams of 50.15% $H_2O_2$ (0.30 mole $H_2O_2$) was charged to a one-liter round bottom flask. A sodium hydroxide solution of 20 grams of NaOH in 100 ml. of $H_2O$ was added dropwise in order to maintain an indicated pH (meter) of approximately 9.0±0.2 (true pH 7.5–8.0). The true pH is measured with standard indicator paper which has been premoistened with distilled water. The sodium hydroxide solution was added over a period of approximately four hours and the temperature of the reaction mixture was maintained between 30° C. and 40° C. The yield of epoxide based upon hydrogen peroxide consumed was 62.5%. In this reaction 0.4 mole of 2-methylbutene or 1-pentene may be substituted for the cyclohexene reactant.

The following example is presented to illustrate the course of the reaction when an ethylenic compound containing reactive substituents is epoxidized by the process of the present invention.

*Example II.—Epoxidation of Butenediol*

Butenediol was epoxidized according to the following reactions:

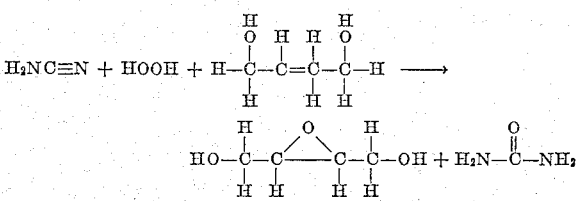

A mixture of 10.5 grams (0.25 mole) of cyanamide, 22 grams (0.25 mole) of 1,4-butenediol, 33.45 grams of 30.5% $H_2O_2$ (0.30 mole $H_2O_2$), and 250 ml. of distilled water was charged to a one-liter round bottom flask equipped with pH electrodes. The mixture was stirred at 35° C. and a solution of 20 grams of NaOH in 100 ml. of $H_2O$ was added dropwise with stirring until the exothermic reaction began. This occurred at about pH 7.5. The reaction was continued for approximately two hours while maintaining the pH within the range 7.5–8.5. The temperature was kept in the range 30–40° C. during the course of the reaction. The yield of epoxide based on peroxide consumed was 76%.

The following example illustrates the operation of the present invention when a substituted cyanamid is employed with hydrogen peroxide to epoxidize an olefin.

*Example III*

The reaction of the present example is represented by the following equation:

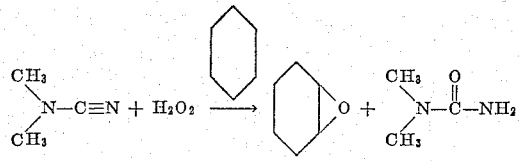

To a one-liter, five-neck, round bottom flask equipped with stirrer, thermometer, two dropping funnels, condenser, and pH electrodes was added 300 ml. of methanol, 70 grams (1.0 mole) of dimethyl cyanamide and 82 grams (1.0 mole) of cyclohexene. Fifty-one grams (0.75 mole) of hydrogen peroxide (50% solution by weight) was placed in one dropping funnel and 1 N NaOH solution was added to the other dropping funnel. The hydrogen peroxide was added dropwise and the temperature maintained at between 35° C. and 40° C. with an ice bath. The pH (meter) was maintained at 9.0–9.5 with the 1 N NaOH. The addition of $H_2O_2$ was completed in 25 minutes. The pH of the mixture continued to drop for one and one-half hours after all of the $H_2O_2$ was added. Cooling was required and a total of 26 ml. of 1 N NaOH was required to maintain the pH within the 9.0–9.5 (meter) range. The reaction mixture was extracted with chloroform followed by removal of the $CHCl_3$ solvent and vacuum distillation of the product. The yield of epoxide product based upon the epoxide content of the undistilled product was 45–50%.

Dibenzyl cyanamide, diphenyl cyanamide and methyl ethyl cyanamide may be substituted for dimethyl cyanamide in the above reaction.

Other specific unsaturated compounds which can be epoxidized include ethene, propylene, 2-butene, pentene, 2-octene, 3-decene, cyclopentene, methyl vinyl ether, allyl vinyl ether, isopropyl isopropenyl ether, methyl cyclohexenyl ether, methallyl cinnamyl ether, ethyl methacrylate, propyl crotonate, allyl acetate, diethyl maleate, oleyl cinnamate, ethyl linoleate, allyl crotonate, butyl oleate, oleic acid and amide, 1,4,5,6,7,7-hexachloro-bicyclo [2.2.1]-2-heptene, 2-methyl tetrahydrobenzyl 2-methyltetrahydrobenzoate, allyl alcohol, and allyl chloride. Unsaturated acids which may be epoxidized are linoleic acid, linolenic acid, licanic acid, ricinoleic acid, petroselenic acid, erucic acid, erythrogenic acid, vaccenic acid; the esters of these acids with glycerol (i.e., glycerides), may also be epoxidized as well as the amides of these acids. Fats and oils which are mixed glycerides (rather than a mixture of simple glycerides) of unsaturated acids may also be epoxidized. Coconut oil, palm oil, babassu oil, lard, whale oil, menhaden oil, olive oil, castor oil, rapeseed oil, colza oil, soybean oil, peanut oil, and tung oil are specific examples of mixtures of such compounds. Fats and oils which may be epoxidized according to the present invention include vegetable and animal fats and oils with a saponification value of from 5 to 250 and an iodine value of from 8 to 205. The saponification value is the number of milligrams of potassium hydroxide required to saponify one gram of fat or oil and iodine value is the grams of iodine added per 100 grams of fat or oil.

I claim as my invention:

1. In a process for making an oxirane compound by epoxidizing an ethylenically unsaturated compound having as the only aliphatic carbon-to-carbon unsaturation olefinic double bonds, the improvement of epoxidizing said ethylenic compound at a pH between 4.0 and 12 and at a temperature from 0° to about 75° C. with hydrogen peroxide in the presence of a cyanamide selected from the group consisting of cyanamide, alkali metal cyanamide, alkaline earth metal cyanamide, ammonium cyanamide, and hydrocarbon-substituted cyanamide, wherein the hydrocarbon contains up to 30 carbon atoms.

2. A process in accordance with claim 1, wherein the cyanamide compound is cyanamide.

3. A process in accordance with claim 1, wherein the cyanamide compound is dimethyl cyanamide.

4. A process in accordance with claim 1, wherein the cyanamide compound is diphenyl cyanamide.

5. A process in accordance with claim 1, wherein the cyanamide is an alkali metal cyanamide.

6. In a process for making an oxirane compound by epoxidizing an ethylenically unsaturated hydrocarbon having as the only aliphatic carbon-to-carbon unsaturation olefinic double bonds, the improvement of reacting said ethylenic hydrocarbon at a pH in the range of 6.0 to 9.5 and at a temperature between 30° and 40° C. with hydrogen peroxide in the presence of a cyanamide compound selected from the group consisting of cyanamide, alkali metal cyanamide, alkaline earth metal cyanamide, ammonium cyanamide, and hydrocarbon-substituted cyanamide, wherein the hydrocarbon contains up to 30 carbon atoms, the mole ratios of ethylenic hydrocarbon to peroxide and of ethylenic hydrocarbon to cyanamide compound being in the range of about 1.1 to about 2.

7. A process in accordance with claim 6, wherein the ethylenic hydrocarbon is cyclohexene.

8. In a process for making 2,3-epoxy-1,4-butanediol by epoxidizing 1,4-butenediol, the improvement of reacting 1,4-butenediol at a pH within the range of 7.5–8.5 and at a temperature of 30–40° C. with hydrogen peroxide in the presence of an equimolar proportion of cyanamide.

References Cited in the file of this patent

UNITED STATES PATENTS 3,053,856     Payne et al. _____ Sept. 11, 1962

OTHER REFERENCES

Migrdichian: The Chemistry of Organic Cyanogen Compounds, Reinhold Publishing Corp. (New York), 1947, p. 119 relied on.

Bergmann: The Chemistry of Acetylene and Related Compounds, p. 80, Interscience Publishers Inc. (New York), 1948.